(12) United States Patent
Hyde et al.

(10) Patent No.: US 9,000,973 B2
(45) Date of Patent: Apr. 7, 2015

(54) PERSONAL ELECTRONIC DEVICE WITH A MICRO-IMPULSE RADAR

(75) Inventors: Roderick A. Hyde, Redmond, WA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 228 days.

(21) Appl. No.: 13/068,049

(22) Filed: Apr. 29, 2011

(65) Prior Publication Data

US 2012/0274502 A1 Nov. 1, 2012

(51) Int. Cl.
| | |
|---|---|
| G01S 13/00 | (2006.01) |
| G08B 23/00 | (2006.01) |
| G01S 13/89 | (2006.01) |
| G01S 7/41 | (2006.01) |
| G01S 13/56 | (2006.01) |
| G01S 13/88 | (2006.01) |
| G01S 7/00 | (2006.01) |

(52) U.S. Cl.
CPC ............. *G01S 13/89* (2013.01); *G01S 7/412* (2013.01); *G01S 13/56* (2013.01); *G01S 13/887* (2013.01); *G01S 7/003* (2013.01)

(58) Field of Classification Search
USPC ........... 342/52–58, 73, 89–97, 175, 189, 197; 340/573.1, 573.4, 573.5, 573.7; 382/103, 115; 600/453, 454, 455, 457; 455/404.1, 404.2, 414.1, 456.1, 456.3
See application file for complete search history.

(56) References Cited

U.S. PATENT DOCUMENTS

| | | | | |
|---|---|---|---|---|
| 4,513,748 | A | * | 4/1985 | Nowogrodzki et al. ....... 600/453 |
| 4,958,638 | A | * | 9/1990 | Sharpe et al. ................. 600/407 |
| 5,361,070 | A | * | 11/1994 | McEwan ......................... 342/21 |
| 5,507,291 | A | * | 4/1996 | Stirbl et al. .................... 600/407 |
| 5,519,400 | A | * | 5/1996 | McEwan ......................... 342/28 |
| 5,544,661 | A | * | 8/1996 | Davis et al. .................... 600/513 |
| 5,579,001 | A | * | 11/1996 | Dempsey et al. ........ 340/870.01 |
| 6,031,454 | A | | 2/2000 | Lovejoy et al. |
| 6,062,216 | A | * | 5/2000 | Corn ......................... 128/204.23 |
| 6,122,537 | A | * | 9/2000 | Schmidt ......................... 600/407 |
| 6,132,371 | A | * | 10/2000 | Dempsey et al. ............. 600/300 |
| 6,295,506 | B1 | * | 9/2001 | Heinonen et al. ............. 702/104 |
| 6,315,719 | B1 | * | 11/2001 | Rode et al. .................... 600/300 |
| 6,396,416 | B1 | * | 5/2002 | Kuusela et al. .......... 340/870.28 |
| 6,417,797 | B1 | | 7/2002 | Cousins et al. |
| 6,454,708 | B1 | * | 9/2002 | Ferguson et al. ............. 600/300 |
| 6,456,231 | B1 | | 9/2002 | McEwan |
| 6,466,125 | B1 | * | 10/2002 | Richards et al. ........... 340/573.4 |
| 6,535,161 | B1 | | 3/2003 | McEwan |
| 6,544,174 | B2 | * | 4/2003 | West et al. ..................... 600/300 |

(Continued)

FOREIGN PATENT DOCUMENTS

WO WO 2008/001092 A2 1/2008

OTHER PUBLICATIONS

Citation for Michahelles et al.; Published at the Eighth International Symposium on Wearable Computers; Oct. 31-Nov. 3, 2004; pp. 4-7, retrieved on Jul. 18, 2012 from the internet at http://ieeexplore.ieee.org/xpls/abs_all.jsp?arnumber=1364682&isnumber=29895&tag=1.

(Continued)

*Primary Examiner* — Peter Bythrow
(74) *Attorney, Agent, or Firm* — Dorsey & Whitney LLP

(57) ABSTRACT

A personal electronic device such as a smart phone can include a micro-impulse radar (MIR).

28 Claims, 7 Drawing Sheets

(56) References Cited

U.S. PATENT DOCUMENTS

| | | | |
|---|---|---|---|
| 6,611,783 B2* | 8/2003 | Kelly et al. .................... 702/150 |
| 6,696,957 B2* | 2/2004 | Shepher ..................... 340/573.1 |
| 7,001,334 B2 | 2/2006 | Reed et al. |
| 7,106,885 B2* | 9/2006 | Osterweil et al. ............. 382/103 |
| 7,440,779 B2 | 10/2008 | Kim et al. |
| 7,567,200 B1* | 7/2009 | Osterweil ........................ 342/28 |
| 7,650,144 B2* | 1/2010 | Nakamura et al. ............ 455/420 |
| 7,753,849 B2* | 7/2010 | Morgan et al. ................ 600/453 |
| 7,898,455 B2 | 3/2011 | Rosenbury |
| 7,916,066 B1 | 3/2011 | Osterweil |
| 8,052,600 B2* | 11/2011 | Beck et al. ..................... 600/301 |
| 8,454,528 B2* | 6/2013 | Yuen et al. ..................... 600/534 |
| 2002/0021231 A1 | 2/2002 | Schlager et al. |
| 2002/0120184 A1* | 8/2002 | Beck et al. ..................... 600/300 |
| 2002/0198632 A1 | 12/2002 | Breed et al. |
| 2003/0135097 A1* | 7/2003 | Wiederhold et al. .......... 600/301 |
| 2003/0160701 A1 | 8/2003 | Nakamura et al. |
| 2004/0027270 A1* | 2/2004 | Fullerton et al. ................ 342/28 |
| 2004/0249258 A1* | 12/2004 | Tupin et al. .................... 600/407 |
| 2005/0040230 A1* | 2/2005 | Swartz et al. .................. 235/383 |
| 2005/0046569 A1 | 3/2005 | Spriggs et al. |
| 2005/0046584 A1 | 3/2005 | Breed |
| 2005/0195101 A1* | 9/2005 | Stevens et al. .................. 342/28 |
| 2005/0242984 A1 | 11/2005 | Waters |
| 2006/0001545 A1* | 1/2006 | Wolf ........................... 340/573.1 |
| 2006/0061504 A1* | 3/2006 | Leach et al. ..................... 342/22 |
| 2006/0119473 A1 | 6/2006 | Gunderson et al. |
| 2006/0195050 A1* | 8/2006 | Alwan et al. ................... 600/595 |
| 2006/0209176 A1* | 9/2006 | Nakamura et al. ......... 348/14.01 |
| 2006/0239471 A1* | 10/2006 | Mao et al. ........................ 381/92 |
| 2006/0253598 A1* | 11/2006 | Nakamura et al. ............ 709/230 |
| 2007/0030115 A1 | 2/2007 | Itsuji et al. |
| 2007/0030156 A1 | 2/2007 | Schlager et al. |
| 2007/0100666 A1 | 5/2007 | Stivoric et al. |
| 2007/0176821 A1 | 8/2007 | Flom et al. |
| 2007/0197881 A1* | 8/2007 | Wolf et al. ..................... 600/300 |
| 2008/0007445 A1 | 1/2008 | Leach, Jr. et al. |
| 2008/0064413 A1 | 3/2008 | Breed |
| 2008/0071467 A1 | 3/2008 | Johnson et al. |
| 2008/0082018 A1* | 4/2008 | Sackner et al. ................ 600/538 |
| 2008/0088462 A1* | 4/2008 | Breed ........................ 340/573.1 |
| 2008/0101329 A1* | 5/2008 | Richards et al. ............... 370/347 |
| 2008/0108372 A1* | 5/2008 | Breed ........................ 455/456.1 |
| 2008/0117094 A1 | 5/2008 | Lindoff et al. |
| 2008/0119716 A1* | 5/2008 | Boric-Lubecke et al. ..... 600/407 |
| 2008/0167535 A1* | 7/2008 | Stivoric et al. ................. 600/301 |
| 2008/0171922 A1* | 7/2008 | Teller et al. .................... 600/301 |
| 2008/0238757 A1* | 10/2008 | Lin et al. ........................... 342/22 |
| 2008/0270172 A1* | 10/2008 | Luff et al. .......................... 705/1 |
| 2008/0275309 A1* | 11/2008 | Stivoric et al. ................. 600/300 |
| 2008/0275349 A1* | 11/2008 | Halperin et al. ............... 600/484 |
| 2008/0287751 A1* | 11/2008 | Stivoric et al. ................. 600/301 |
| 2008/0287817 A1* | 11/2008 | Stivoric et al. ................. 600/508 |
| 2008/0311882 A1 | 12/2008 | Schlager et al. |
| 2009/0017910 A1* | 1/2009 | Rofougaran et al. ........... 463/36 |
| 2009/0052859 A1* | 2/2009 | Greenberger et al. .......... 386/46 |
| 2009/0058711 A1* | 3/2009 | Dixon et al. ..................... 342/28 |
| 2009/0138805 A1* | 5/2009 | Hildreth ......................... 715/745 |
| 2009/0177068 A1* | 7/2009 | Stivoric et al. ................. 600/365 |
| 2009/0215488 A1* | 8/2009 | Causey et al. ............... 455/556.1 |
| 2010/0026550 A1 | 2/2010 | Rosenbury |
| 2010/0130873 A1* | 5/2010 | Yuen et al. ..................... 600/484 |
| 2010/0141443 A1* | 6/2010 | Romero et al. ................ 340/551 |
| 2010/0198083 A1* | 8/2010 | Lin et al. ........................ 600/484 |
| 2010/0214149 A1 | 8/2010 | Kuhn |
| 2010/0240999 A1* | 9/2010 | Droitcour et al. .............. 600/453 |
| 2010/0286532 A1 | 11/2010 | Farringdon et al. |
| 2010/0306388 A1* | 12/2010 | Newville ....................... 709/227 |
| 2011/0161136 A1* | 6/2011 | Faith et al. .................... 705/7.29 |
| 2011/0237274 A1* | 9/2011 | Wong et al. ................. 455/456.1 |

OTHER PUBLICATIONS

Michahelles et al.; "Less Contact: Heart-Rate Detection Without Even Touching the User"; Eighth International Symposium on Wearable Computers; bearing a date of 2004; pp. 1-4; vol. 1; located at http://72.52.208.92/~gbpprorg/mil/cavity/iswc04_radar.pdf.

PCT International Search Report; International App. No. PCT/US12/35386; Aug. 13, 2012; pp. 1-3.

European Patent Office, Supplementary European Search Report, Pursuant to Rule 62 EPC; App. No. EP 12777396.8; Sep. 26, 2014 (received by our Agent on Sep. 30, 2014); pp. 1-8.

* cited by examiner

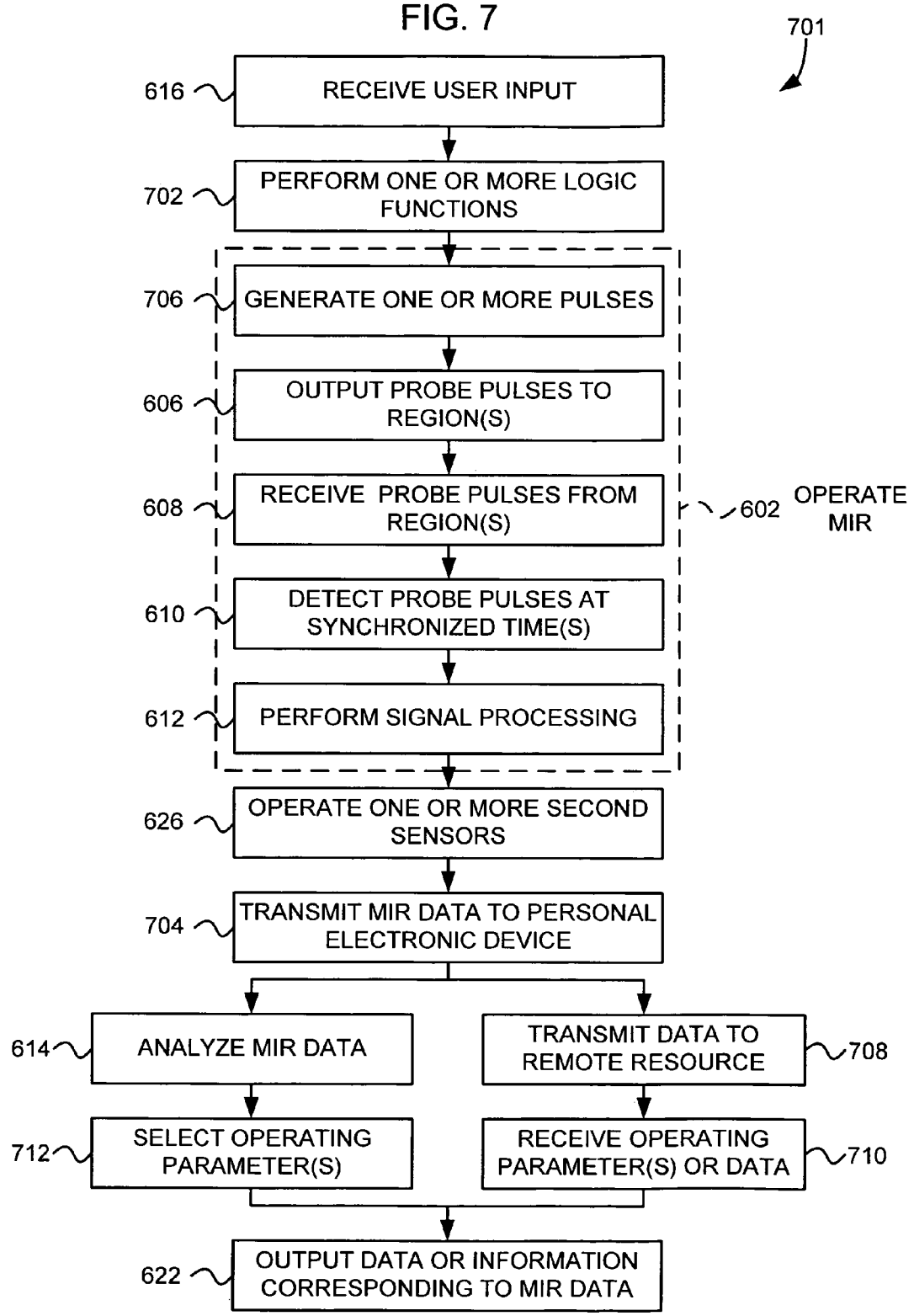

PERSONAL ELECTRONIC DEVICE WITH A MICRO-IMPULSE RADAR

CROSS-REFERENCE TO RELATED APPLICATIONS

The present application is related to and, if appropriate, claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application is related to the following United States Patent Application:

Application No. 13/068,051, entitled NETWORK AND PERSONAL ELECTRONIC DEVICES OPERATIVELY COUPLED TO MICRO-IMPULSE RADARS, naming Roderick A. Hyde, Jordin T. Kare, and Lowell L. Wood, Jr. as inventors, filed on 29, Apr. 2011.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a device can include a personal electronic device and at least one micro-impulse radar (MIR) operatively coupled to the personal electronic device and configured to probe one or more regions near the personal electronic device.

According to an embodiment, a method for operating a personal electronic device can include operating a MIR operatively coupled to the personal electronic device to produce MIR data and at least conditionally performing one or more logic functions responsive to the MIR data.

According to an embodiment, a non-transitory computer-readable medium can carry computer instructions configured to cause a personal electronic device to operate a MIR included in or operatively coupled to the personal electronic device to produce MIR data and at least conditionally performing one or more logic functions responsive to the MIR data.

According to an embodiment, a method for operating a personal electronic device can include performing one or more logic functions and, responsive to results of the one or more logic functions, operating a MIR included in or operatively coupled to the personal electronic device to produce MIR data.

According to an embodiment, a non-transitory computer-readable medium can carry computer instructions configured to cause a personal electronic device to perform one or more logic functions and, responsive to results of the one or more logic functions, operate a MIR included in or operatively coupled to the personal electronic device to produce MIR data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 is a flow chart showing a method for operating a MIR operatively coupled to a personal electronic device responsive to performing one or more logic functions for the personal electronic device, according to an embodiment.

DETAILED DESCRIPTION

Figure 1:
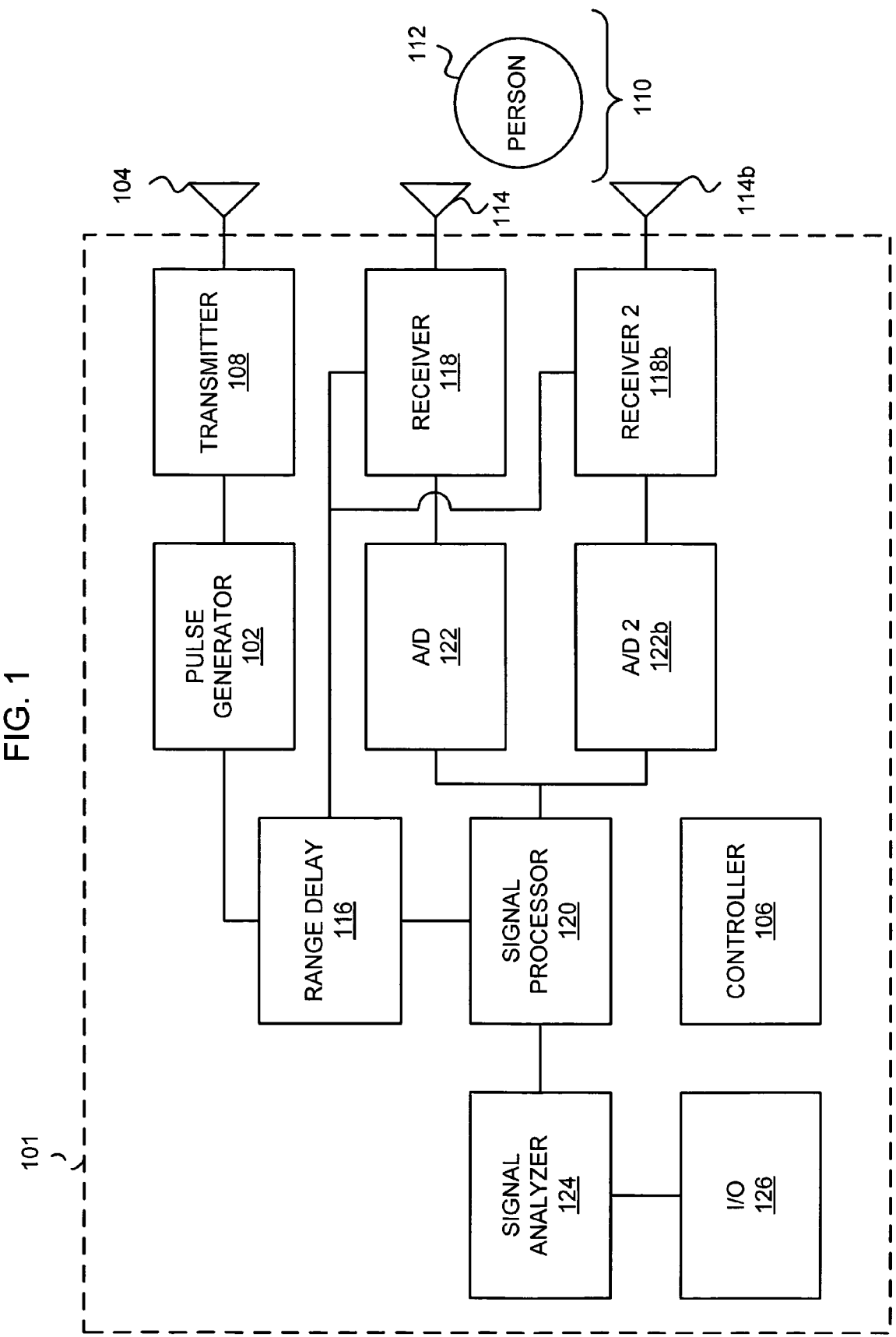
FIG. 1 is a simplified block diagram of a micro-impulse radar (MIR), according to an embodiment.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here.

FIG. 1 is a simplified block diagram of a micro-impulse radar (MIR) 101, according to an embodiment. A pulse generator 102 is configured to output a relatively short voltage pulse that is applied to a transmit antenna 104. A typical transmitted pulse width can be between about two hundred picoseconds and about 5 nanoseconds, for example. The voltage pulse can be conditioned and amplified (or attenuated) for output by a transmitter 108. For example, the transmitter 108 can transmit the voltage pulse or can further condition the pulse, such as by differentiating a leading and/or trailing edge to produce a short sub-nanosecond transmitted pulses. The voltage pulse is typically not modulated onto a carrier frequency. Rather, the voltage pulse transmission spectrum is the frequency domain transform of the emitted pulse. The MIR 101 can probe a region 110 by emitting a series of spaced voltage pulses. For example, the series of voltage pulses can be spaced between about 100 nanoseconds and 100 microseconds apart. Typically, the pulse generator 102 emits the voltage pulses with non-uniform spacing such as random or pseudo-random spacing, although constant spacing can be used if interference or compliance is not a concern. Spacing between the series of voltage pulses can be varied responsive to detection of one or more persons 112 in the region 110. For example, the spacing between pulses can be relatively large when a person 112 is not detected in the region 110. Spacing between pulses can be decreased (responsive to command(s) from a controller 106) when a person 112 is detected in the region 110. For example, the decreased time between pulses can result in faster MIR data generation for purposes of more quickly determining information about one or more persons 112 in the region 110. The emitted series of voltage pulses can be characterized by spectral components having high penetration that can pass through a range of materials and geometries in the region 110.

An object 112 (such as a person) in the probed region 110 can selectively reflect, refract, absorb, and/or otherwise scatter the emitted pulses. A return signal including a reflected, refracted, absorbed, and/or otherwise scattered signal can be received by a receive antenna 114. Optionally, the receive antenna 114 and transmit antenna 104 can be combined into a single antenna. In a single antenna embodiment, a filter (not shown) can be used to separate the return signal from the emitted pulse.

A probed region 110 can be defined according to an angular extent and distance from the transmit antenna 104 and the receive antenna 114. Distance can be determined by a range delay 116 configured to trigger a receiver 118 operatively coupled to the receive antenna 114. For example, the receiver 118 can include a voltage detector such as a capture-and-hold capacitor or network. The range delay corresponds to distance into the region 110. Range delay can be modulated to capture information corresponding to different distances.

A signal processor 120 can be configured to receive detection signals or data from the receiver 118 and the analog to digital converter 122, and by correlating range delay to the detection signal, extract data corresponding to the probed region 110 including the object 112.

Optionally, the MIR 101 can include a second receive antenna 114b. The second receive antenna 114b can be operatively coupled to a second receiver 118b coupled to an output of the range delay 116 or a separate range delay (not shown) configured to provide a delay selected for a depth into the region 110. The signal processor 120 can further receive output from a second A/D converter 122b operatively coupled to the second receiver 118b.

The signal processor 120 can be configured to compare detection signals received by the antennas 114, 114b. For example, the signal processor 120 can search for common signal characteristics such as similar reflected static signal strength or spectrum, similar (or corresponding) Doppler shift, and/or common periodic motion components, and compare the respective range delays corresponding to detection by the respective antennas 114, 114b. Signals sharing one or more characteristics can be correlated to triangulate to a location of one or more objects 112 in the region 110 relative to known locations of the antennas 114, 114b. The triangulated locations can be output as computed ranges of angle or computed ranges of extent.

For example, a first signal corresponding to a reflected pulse received by an antenna element 114 can be digitized by an analog-to-digital converter (A/D) 122 to form a first digitized waveform. A second signal corresponding to the reflected pulse received by a second antenna element 114b can similarly be digitized by an A/D 122b (or alternatively by the same A/D converter 122) to form a second digitized waveform. The signal processor 120 can compare the first and second digitized waveforms and deduce angular information from the first and second digitized waveforms and known geometry of the first and second antenna elements.

A second pulse can be received at a second range delay 116 value and can be similarly signal processed to produce a second set of angular information that maps a second surface at a different distance. Depth within a given range delay can be inferred from a strength of the reflected signal. A greater number of signals can be combined to provide additional depth information. A series of pulses can be combined to form a time series-of signals corresponding to the object 112 that includes movement information of the object 112 through the region 110. The object 112 described herein can include one or more persons.

The signal processor 120 outputs MIR data. The MIR data can include object location information, object shape information, object velocity information, information about inclusion of high density and/or conductive objects such as jewelry, cell phones, glasses including metal, etc., and physiological information related to periodic motion. The MIR data can include spatial information, time-domain motion information, and/or frequency domain information. Optionally, the MIR data can be output in the form of an image. MIR data in the form of an image can include a surface slice made of pixels or a volume made of voxels. Optionally, the image can include vector information.

The MIR data from the signal processor 120 is output to a signal analyzer 124. The signal analyzer 124 can be integrated with the signal processor 120 and/or can be included in the same MIR 101, as shown. Alternatively, the signal processor 120 can output MIR data through an interface to a signal analyzer 124 included in an apparatus separate from the MIR 101.

A signal analyzer 124 can be configured to extract desired information from MIR data received from the signal processor 120. Data corresponding to the extracted information can be saved in a memory for access by a data interface 126 or can be pushed out the data interface 126.

The signal analyzer 124 can be configured to determine the presence of a person 112 in the region 110. For example, MIR data from the signal processor can include data having a static spectrum at a location in the region 110, and a periodic motion spectrum corresponding to the location characteristic of a human physiological process (e.g. heartbeat and/or breathing). From the correspondence of such MIR data, it can be deduced that a person 112 is at the location in the region 110. The signal analyzer 124 can be configured to determine a number of persons 112 in the region 110. The signal analyzer 124 can be configured to determine the size of a person and/or relative size of anatomical features of a person 112 in the region 110. The signal analyzer 124 can be configured to determine the presence of an animal 112 in the region 110.

The signal analyzer 124 can be configured to determine movement and/or speed of movement of a person 112 through the region 110. The signal analyzer 124 can be configured to determine or infer the orientation of a person 112 such as the direction a person is facing relative to the region 110. The signal analyzer 124 can be configured to determine one or more physiological aspects of a person 112 in the region 110. The signal analyzer 124 can determine presence of a personal appliance such as a cell phone, PDA, etc. and/or presence of metalized objects such as credit cards, smart cards, access cards, etc. The signal analyzer 124 can infer the gender and age of one or more persons based on returned MIR data. For example, male bodies can generally be characterized by higher mass density than female bodies, and thus can be characterized by somewhat greater reflectivity at a given range. Adult female bodies can exhibit relatively greater harmonic motion ("jiggle") responsive to movements, and can thus be correlated to harmonic spectra characteristics. Older persons generally move differently than younger persons, allowing an age inference based on detected movement in the region 110.

By determination of one or more such aspects and/or combinations of aspects, the signal analyzer 124 can determine a demographic of one or more persons 112 in the region 110.

For example, MIR data can include movement corresponding to the beating heart of one or more persons 112 in the region 110. The signal analyzer 124 can filter the MIR data to remove information not corresponding to a range of heart rates, and determine one or more heart rates by comparing movement of the heart surface to the MIR signal rate. The one or more heart rates can further be characterized according to a confidence factor, depending on statistical certainty regarding the determined one or more heart rates.

Similarly, the signal analyzer 124 can determine one or more respiration rates by measuring movement corresponding to the chest or diaphragm of one or more persons 112. The signal analyzer 124 can determine movement, a direction of movement, and/or a rate of movement of one or more persons 112 in the region 110. Operation of the signal analyzer 124 is described in greater detail below by reference to FIGS. 2 and 3.

An electronic controller 106 can be operatively coupled to the pulse generator 102, the transmitter 108, the range delay 116, the receiver 118, the analog-to-digital converter 122, the signal processor 120, and/or the signal analyzer 124 to control the operation of the components of the MIR 101. For embodiments so equipped, the electronic controller 106 can also be operatively coupled to the second receiver 118b, and the second analog-to-digital converter 122b. The data interface 126 can include a high speed interface configured to output data from the signal analyzer 124. Alternatively, for cases where signals are analyzed externally to the MIR, the data interface 126 can include a high speed interface configured to output MIR data from the signal processor 120. The data interface 126 can include an interface to the controller 106. Optionally, the controller 106 can be interfaced to external systems via a separate interface (not shown).

Figure 2:
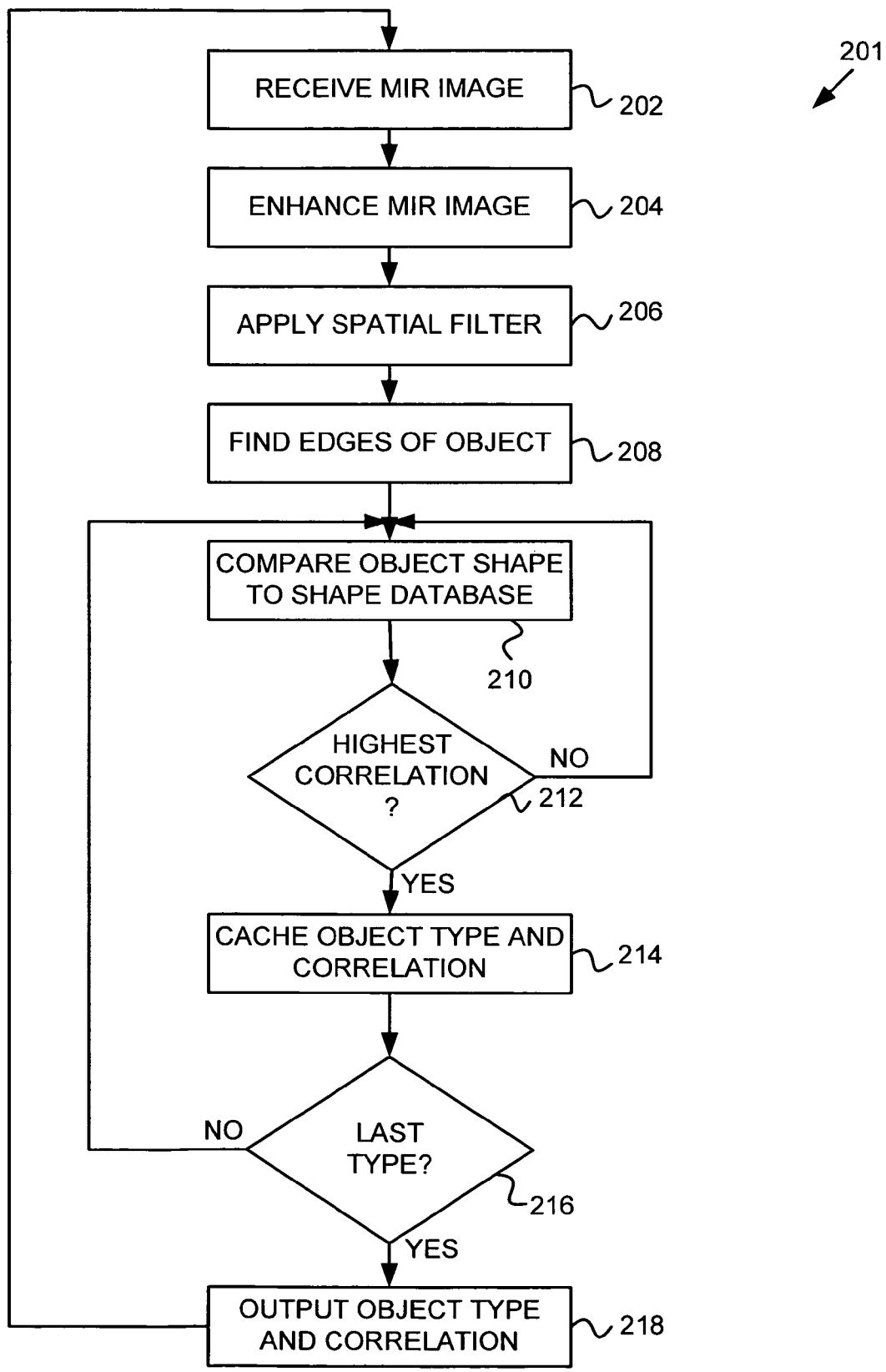
FIG. 2 is a flow chart showing an illustrative process for determining the presence of a person in a region with the MIR of FIG. 1, according to an embodiment.

FIG. 2 is a flow chart showing an illustrative process 201 for determining the presence of one or more persons 112 in the region 110 with the signal analyzer 124 of the MIR 101, according to an embodiment. Beginning with step 202, MIR data is received as described above in conjunction with FIG. 1. The MIR data can correspond to a plurality of probes of the region 110. Proceeding to optional step 204, the MIR data can be enhanced to facilitate processing. For example, grayscale data corresponding to static reflection strength as a function of triangulated position can be adjusted, compressed, quantized, and/or expanded to meet a desired average signal brightness and range. Additionally or alternatively, velocity information corresponding to Doppler shift, and/or frequency transform information corresponding to periodically varying velocity can similarly be adjusted, compressed, quantized, and/or expanded. Systematic, large scale variations in brightness can be balanced, such as to account for side-to-side variations in antenna coupling to the region. Contrast can be enhanced such as to amplify reflectance variations in the region.

Proceeding to optional step 206, a spatial filter can be applied. Application of a spatial filter can reduce processing time and/or capacity requirements for subsequent steps described below. The spatial filter can, for example, include a computed angle or computed extent filter configured to remove information corresponding to areas of contrast, velocity, or frequency component(s) having insufficient physical extent to be large enough to be an object of interest. The spatial filter can, for example, identify portions of the region 110 having sufficient physical extent to correspond to body parts or an entire body of a person 112, and remove features corresponding to smaller objects such as small animals, leaves of plants, or other clutter. According to an embodiment, the spatial filter can remove information corresponding to areas of contrast, velocity, or frequency component(s) having physical extent greater than a maximum angle or extent that is likely to correspond to a person or persons 112. In other embodiments, the spatial filter applied in step 206 can eliminate small, low contrast features, but retain small, high contrast features such as jewelry, since such body ornamentation can be useful in some subsequent processes. The step of applying the spatial filter 206 can further include removing background features from the MIR data. For example, a wall lying between an antenna 104, 114 and the region 110 can cast a shadow such as a line in every MIR signal. Removal of such constant features can reduce subsequent processing requirements.

Proceeding to optional step 208, an edge-finder can identify edges of objects 112 in the region 110. For example, a global threshold, local threshold, second derivative, or other algorithm can identify edge candidates. Object edges can be used, for example, to identify object shapes, and thus relieve subsequent processes from operating on grayscale data. Alternatively, step 208 can be omitted and the process of identifying objects can be performed on the grayscale MIR data.

Proceeding to step 210, processed data corresponding to the MIR data is compared to a database to determine a match. The object data received from step 202 (and optionally steps 204, 206, and/or 208) can be compared to corresponding data for known objects in a shape database. Step 210 can be performed on a grayscale signal, but for simplicity of description it will be assumed that optional step 208 was performed and matching is performed using object edges, velocity, and/or spectrum values. For example, the edge of an object 112 in the region 110 can include a line corresponding to the outline of the head and torso, cardiac spectrum, and movements characteristic of a young adult male. A first shape in the shape database can include the outline of the head and torso, cardiac spectrum, density, and movements characteristic of a young adult female and/or the head and torso outline, cardiac spectrum, density, and movements characteristic of a generic human. The differences between the MIR data and the shape database shape can be measured and characterized to derive a probability value. For example, a least-squares difference can be calculated.

Optionally, the object shape from the MIR data can be stepped across, magnified, and stepped up and down the shape database data to minimize a sum-of-squares difference between the MIR shape and the first shape in the shape database. The minimum difference corresponds to the probability value for the first shape.

Proceeding to step 212, if the probability value for the first shape is the best probability yet encountered, the process proceeds to step 214. For the first shape tested, the first probability value is the best probability yet encountered. If an earlier tested shape had a higher probability to the MIR data, the process loops back from step 212 to step 210 and the fit comparison is repeated for the next shape from the shape database.

In step 214, the object type for the compared shape from the shape database and the best probability value for the compared shape are temporarily stored for future comparison and/or output. For example, the compared shape from the shape database can be identified by metadata that is included in the database or embedded in the comparison data. Proceeding to step 216, the process either loops back to step 210 or proceeds to step 218, depending on whether a test is met. If the most recently compared shape is the last shape available for comparison, then the process proceeds to step 218. Optionally, if the most recently compared shape is the last shape that the process has time to compare (for example, if a new MIR data is received and/or if another process requires output data from the process 201) then the process proceeds to step 218. In step 218, the object type and the probability value is output. The process can then loop back to step 202 and the process 201 can be repeated.

Otherwise, the process 201 loops from step 216 back to step 210. Again, in step 210, the next comparison shape from a shape database is loaded. According to an embodiment, the comparison can proceed from the last tested shape in the shape database. In this way, if the step 218 to 202 loop occurs more rapidly than all objects in the shape database can be compared, the process eventually works its way through the entire shape database. According to an embodiment, the shape database can include multiple copies of the same object at different orientations, distances, and positions within the region. This can be useful to reduce processing associated with stepping the MIR shape across the shape database shape and/or changing magnification.

The object type can include determination of a number of persons 112 in the region 110. For example, the shape database can include outlines, cardiac and/or respiration spectra, density, and movement characteristics for plural numbers of persons. According to embodiments, the shape library can include shapes not corresponding to persons. This can aid in identification of circumstances where no person 212 is in the region 210. Optionally, process 201 can be performed using plural video frames such as averaged video frames or a series of video frames. Optionally, steps 212, 214, and 216 can be replaced by a single decision step that compares the probability to a predetermined value and proceeds to step 218 if the probability meets the predetermined value. This can be useful, for example, in embodiments where simple presence or absence of a person 212 in the region 210 is sufficient information.

According to an embodiment, the signal analysis process 201 of FIG. 2 can be performed using conventional software running on a general-purpose microprocessor. Optionally, the process 201 can use various combinations of hardware, firmware, and software; and can include the use of a digital signal processor.

Figure 3:
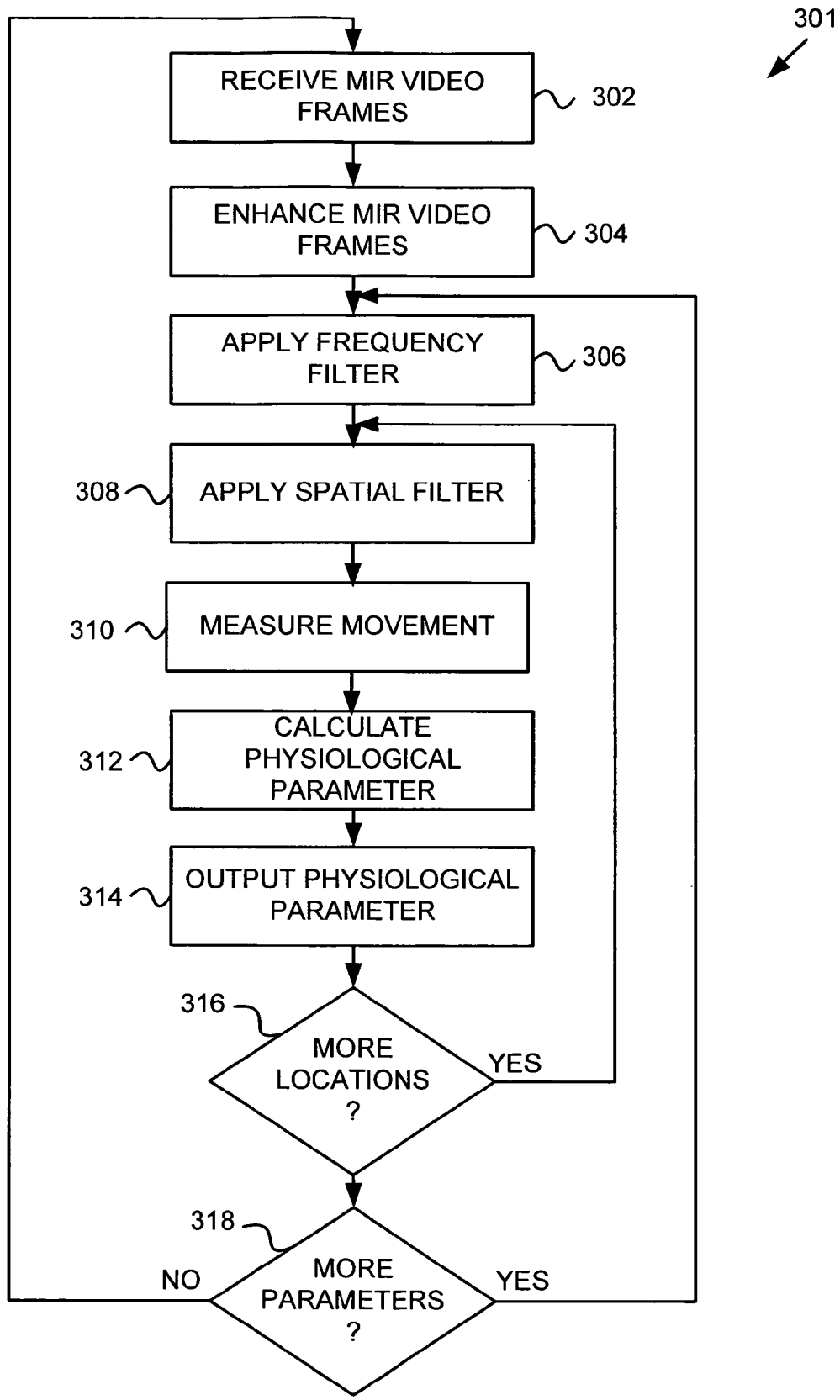
FIG. 3 is a flow chart showing an illustrative process for determining a physiological parameter of a person in a region with the MIR of FIG. 1, according to an embodiment.

FIG. 3 is a flow chart showing an illustrative process 301 for determining one or more particular physiological parameters of a person 112 in the region 110 with the signal analyzer 124 of the MIR 101, according to an embodiment. Optionally, the process 301 of FIG. 3 can be performed conditional to the results of another process such as the process 201 of FIG. 2. For example, if the process 201 determines that no person 112 is in the region 110, then it can be preferable to continue to repeat process 201 rather than execute process 301 in an attempt to extract one or more particular physiological parameters from a person that is not present.

Beginning with step 302, a series of MIR time series data is received. While the received time series data need not be purely sequential, the process 301 generally needs the time series data received in step 302 to have a temporal capture relationship appropriate for extracting time-based information. According to an embodiment, the MIR time series data can have a frame rate between about 16 frames per second and about 120 frames per second. Higher capture rate systems can benefit from depopulating frames, such as by dropping every other frame, to reduce data processing capacity requirements.

Proceeding to step 304, the MIR video frames can be enhanced in a manner akin to that described in conjunction with step 204 of FIG. 2. Optionally, step 304 can include averaging and/or smoothing across multiple MIR time series data. Proceeding to optional step 306, a frequency filter can be applied. The frequency filter can operate by comparing changes between MIR time series data to a reference frequency band for extracting a desired physical parameter. For example, if a desired physiological parameter is a heart rate, then it can be useful to apply a pass band for periodic movements having a frequency between about 20 cycles per minute and about 200 cycles per minute, since periodic motion beyond those limits is unlikely to be related to a human heart rate. Alternatively, step 304 can include a high pass filter that removes periodic motion below a predetermined limit, but retains higher frequency information that can be useful for determining atypical physiological parameters.

Proceeding to optional step 308, a spatial filter can be applied. The spatial filter can, for example, include a pass band filter configured to remove information corresponding to areas of contrast having insufficient physical extent to be large enough to be an object of interest, and remove information corresponding to areas too large to be an object of interest. The spatial filter can, for example, identify portions of the region 110 having sufficient physical extent to correspond to the heart, diaphragm, or chest of a person 112, and remove signal features corresponding to smaller or larger objects. The step of applying the spatial filter 308 can further include removing background features from the MIR data. For example, a wall lying between an antenna 104, 114 (114*b*) and the region 110 can cast a shadow such as a line in every instance of MIR data. Removal of such constant features can reduce subsequent processing requirements.

Proceeding to step 310, movement such as periodic movement in the MIR time series data is measured. For example, when a periodic motion is to be measured, a time-to-frequency domain transform can be performed on selected signal elements. For example, when a non-periodic motion such as translation or rotation is to be measured, a rate of movement of selected signal elements can be determined. Optionally, periodic and/or non-periodic motion can be measured in space vs. time. Arrhythmic movement features can be measured as spread in frequency domain bright points or can be determined as motion vs. time. Optionally, subsets of the selected signal elements can be analyzed for arrhythmic features. Optionally, plural subsets of selected signal elements can be cross-correlated for periodic and/or arrhythmic features. Optionally, one or more motion phase relationships between plural subsets of selected signal features, between a subset of a selected signal feature and the signal feature, or between signal features can be determined.

For example, a person with a hiccup can be detected as a non-periodic or arrhythmic motion superimposed over periodic motion of a signal element corresponding to the diaphragm of the person.

Proceeding to step 312, a physiological parameter can be calculated. For example, MIR data can include data having a periodic motion spectrum corresponding to the location characteristic of a human physiological process (e.g. heartbeat and/or breathing). Step 312 can include determining one or more heart rates by comparing movement of the heart surface to the MIR signal rate. The one or more heart rates can further be characterized according to a confidence factor, depending on statistical certainty regarding the determined one or more heart rates. Similarly, step 312 can include determining one or more respiration rates by measuring movement corresponding to the chest or diaphragm of one or more persons.

Proceeding to step 314, the physiological parameter can be output. Proceeding to step 316, if there are more locations to measure, the process 301 can loop back to execute step 308. If there are not more locations to measure, the process can proceed to step 318. In step 318, if there are more physiological parameters to measure, the process 301 can loop back to execute step 306. If there are not more physiological parameters to measure, the process 301 can loop back to step 302, and the process 301 of FIG. 3 can be repeated.

Figure 4:
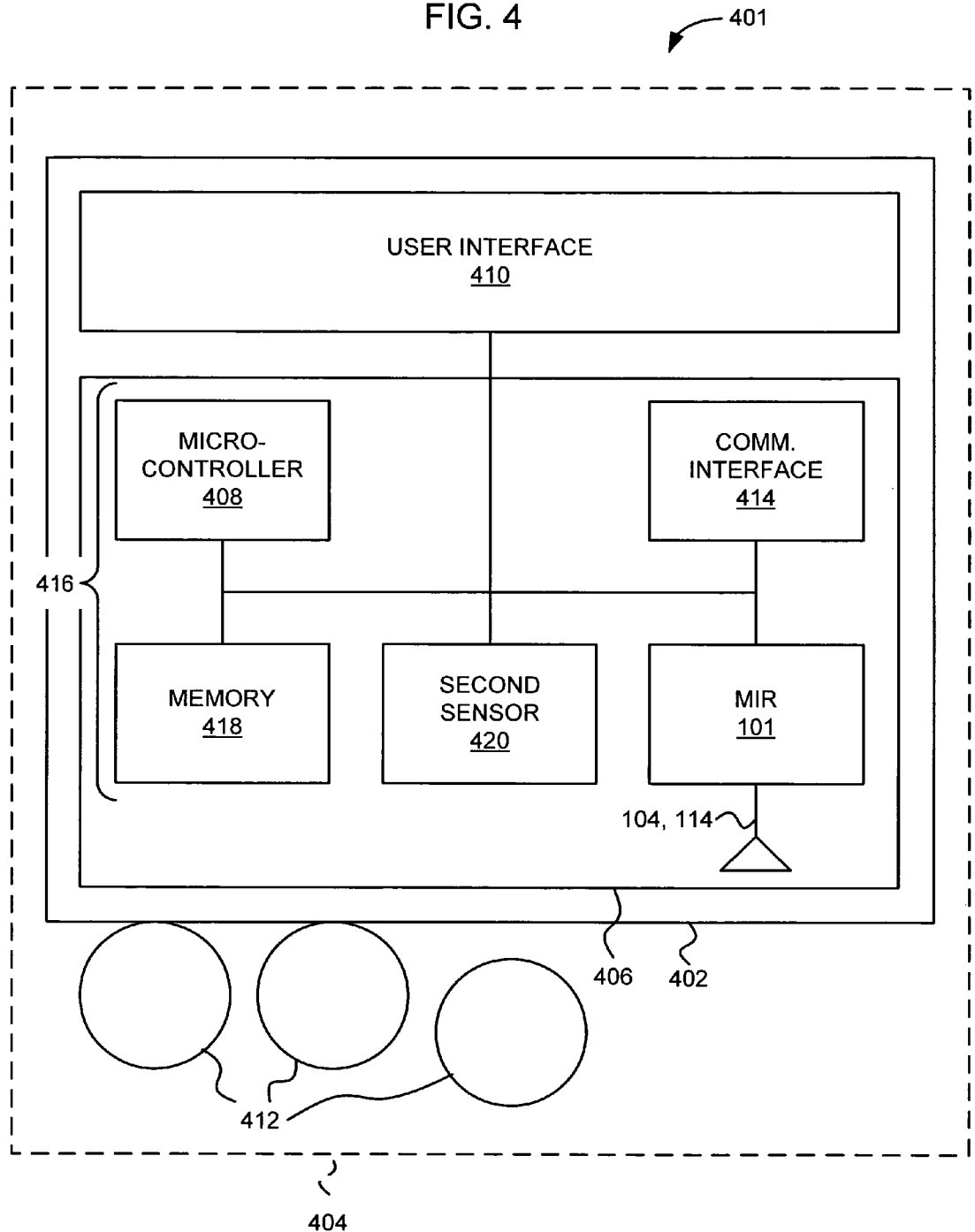
FIG. 4 is a block diagram of a personal electronic device including a MIR, according to an embodiment.

FIG. 4 is a block diagram of a personal electronic device 401 including a MIR 101, according to an embodiment. The personal electronic device 402 can be a cellular phone, a smart phone, a personal data assistant, a pager, or a tablet computer, for example. The device 401 can include at least one MIR 101 operatively coupled to the personal electronic device 402 and configured to probe one or more regions 404 near the personal electronic device 402. The MIR 101 can be operatively coupled to the personal electronic device 402 via an exposed interface. For example, the exposed interface can include a USB interface, a SIM card interface, a WiFi interface, a BlueTooth interface, a ZigBee interface, an infrared interface, or a proprietary interface.

Alternatively, at least a portion of the MIR 101 can be located inside the personal electronic device 402. The personal electronic device 402 can include at least one circuit board 406. At least a portion of the MIR 101 can be integrated with the circuit board(s) 406. The MIR 101 can include one or more antennas 104, 114 formed as electrical traces on the circuit board(s) 406. Optionally, the MIR 101 can include a pulse generator (see FIG. 1, 102) and a range delay (see FIG. 1, 116) embodied as operations of a microcontroller or microprocessor 408. Furthermore, the MIR 101 can include at least one receiver (see FIG. 1, 118) embodied as one or more capture-and-hold capacitors (not shown) on the circuit board(s) 406 operatively coupled to antenna(s) 104, 114. Alternatively, the capture-and-hold capacitor(s) can be integrated into the microcontroller or microprocessor 408. Optionally, the MIR 101 can also include a signal processor (see FIG. 1, 120) embodied as software or firmware running on the microcontroller or microprocessor 408.

Optionally, the MIR 101 can be configured in a bistatic architecture with at least one component of the MIR 101 being in the personal electronic device 402, and at least one other component of the MIR being located separately. For example, the personal electronic device can include at least one transmitter (see FIG. 1, 108) or at least one receiver component (see FIG. 1, 118) of the MIR 101. A personal electronic device 402 including an MIR 101 having a bistatic architecture is described more fully in conjunction with FIG. 5, below. Alternatively, the MIR 101 can be made according to a monostatic architecture, with substantially the entire MIR being in the personal electronic device 402.

The personal electronic device 402 can include a user interface 410. The user interface 410 can include a display, or alternatively, one or more of a haptic or audio output device. The personal electronic device 402 can output user perceptible data on the user interface 410 corresponding to MIR data from the MIR 101. The personal electronic device 402 can be configured to output the user perceptible data as a minimally-processed representation of MIR data from the MIR 101 or as a processed representation of MIR data from the MIR 101. For example, the user perceptible data can include a display indicating the location of objects 412 imaged by the MIR 101 in association with a map. Optionally, the personal electronic device 402 can output a representation of one or more operating parameters selected or changed responsive to MIR data from the MIR 101.

Optionally, the personal electronic device 402 can include a network communication interface 414 configured to output MIR data to a network resource (not shown). The network communication interface 404 can be configured to receive data determined responsive to MIR data from the MIR 101 from the network resource (not shown).

The personal electronic device 402 can include logic circuitry 416 operatively coupled to the MIR 101 and configured to analyze MIR data from the MIR 101. The logic circuitry 416 can include the microcontroller or microprocessor 408, memory 418, and/or other related components.

The logic circuitry 416 can also be operatively coupled to the user interface 410. The user interface 410 can receive user commands corresponding to one or more interactions between the MIR 110 and the logic circuitry 416. The interaction(s) can include a manual MIR 101 probe or automatic interaction(s). For example, automatic interaction(s) can include one or more of a schedule of probes, coupling to a computer program-driven control, and/or coupling to received external commands. Commands received through the user interface 410 can include selection of a MIR probe direction or selection of sensitivity to a subset of probe regions 404.

Optionally, the personal electronic device 402 can include one or more second sensors 420 operatively coupled to the logic circuitry 416. For example, the personal electronic device 402 can include logic circuitry 416 operatively coupled to the MIR 101 and/or the one or more second sensors 420. The logic circuitry 416 can be configured to select one or more operating parameters for the personal electronic device 402 responsive to data or signals from the one or more second sensors 420 and/or data from the MIR 101.

Optionally, the logic circuitry 416 can be configured to output data via the user interface 410 responsive to data or signals from the second sensor(s) 420 and/or responsive to data from the MIR 101. The second sensor(s) 420 can include one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor, for example.

Figure 5:
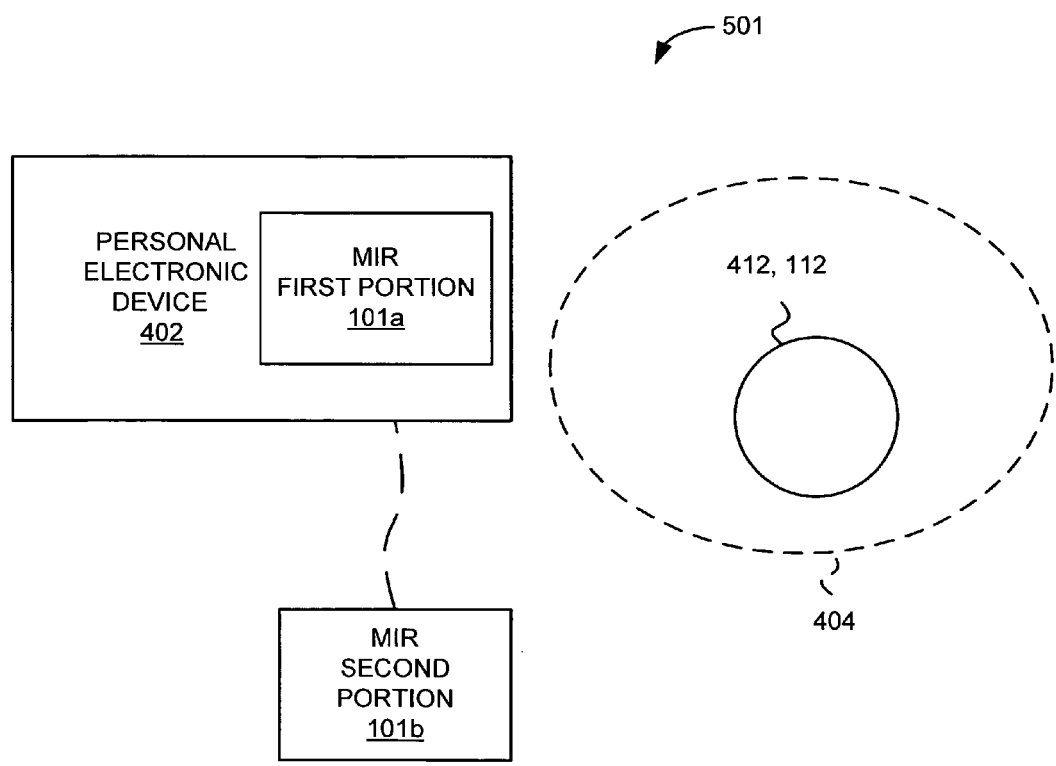
FIG. 5 is a block diagram showing a system wherein a personal electronic device includes at least one component of a MIR, and a second portion of the MIR is outside the personal electronic device, to form a bistatic MIR architecture, according to an embodiment.

FIG. 5 is a block diagram of a system 501 a MIR 101a, 101b formed according to a bistatic architecture. In a bistatic architecture, the personal electronic device 402 can include at least one component of the bistatic MIR 101a, 101b. The bistatic MIR can include a first MIR portion 101a that is physically associated with the personal electronic device and a second MIR portion 101b that is not physically associated with the personal electronic device 402. Respective time synchronization circuits (not shown) operatively coupled to the MIR portions 101a, 101b can be used to synchronize probe pulse receiving to probe pulse output.

For example, the personal electronic device 402 can include a time synchronization transmission circuit (not shown) configured to output probe pulse timing information to the second MIR portion 101b. A pulse data receiving circuit (not shown) in the personal electronic device 402 can be configured to receive data corresponding to received probe pulses from the second MIR portion 101b. The first portion of the MIR 101a can include a pulse generator (see FIG. 1, 102) and at least one output antenna (see FIG. 1, 104) operatively coupled to the pulse generator 102 and configured to output probe pulses to one or more regions 404, 110. The second portion of the MIR 101b can include a time synchronization receiving circuit (not shown) configured to receive the probe pulse timing information from the personal electronic device 402, at least one receiving antenna (see FIG. 1, 114) configured to receive probe pulses from the one or more regions 404, 110, and at least one receiving circuit (see FIG. 1, 118) operatively coupled to the time synchronization receiving circuit (not shown) and the at least one antenna 118. The at least one receiving circuit 118 can be configured to detect the probe pulses at times synchronized with probe pulse output by the first MIR portion 101a. The second portion of the MIR 101b can also include a pulse data transmission circuit (not shown) configured to transmit data corresponding to the detected probe pulses to the personal electronic device 402.

Alternatively, the personal electronic device 402 can include a time synchronization receiving circuit (not shown) configured to receive the probe pulse timing information from the second MIR portion 101b. The first MIR portion 101a can include at least one antenna (see FIG. 1, 114) configured to receive probe pulses from the one or more regions 404, 110 and at least one receiving circuit (see FIG. 1, 118) operatively coupled to the time synchronization receiving circuit (not shown) and the at least one antenna 114. The at least one receiving circuit 118 can be configured to detect the probe pulses at a time synchronized with probe pulse output. The second portion of the MIR 101b can include a time synchronization transmission circuit (not shown) configured to output probe pulse timing information to the personal electronic device 402, a pulse generator (see FIG. 1, 102) operatively coupled to the time synchronization transmission circuit (not shown), and at least one output antenna (see FIG. 1, 104) operatively coupled to the pulse generator 102. The second portion of the MIR 101b can thus be configured to output probe pulses to the one or more regions 404, 110, with the first portion of the MIR 101a being configured to receive the probe pulses.

Figure 6:
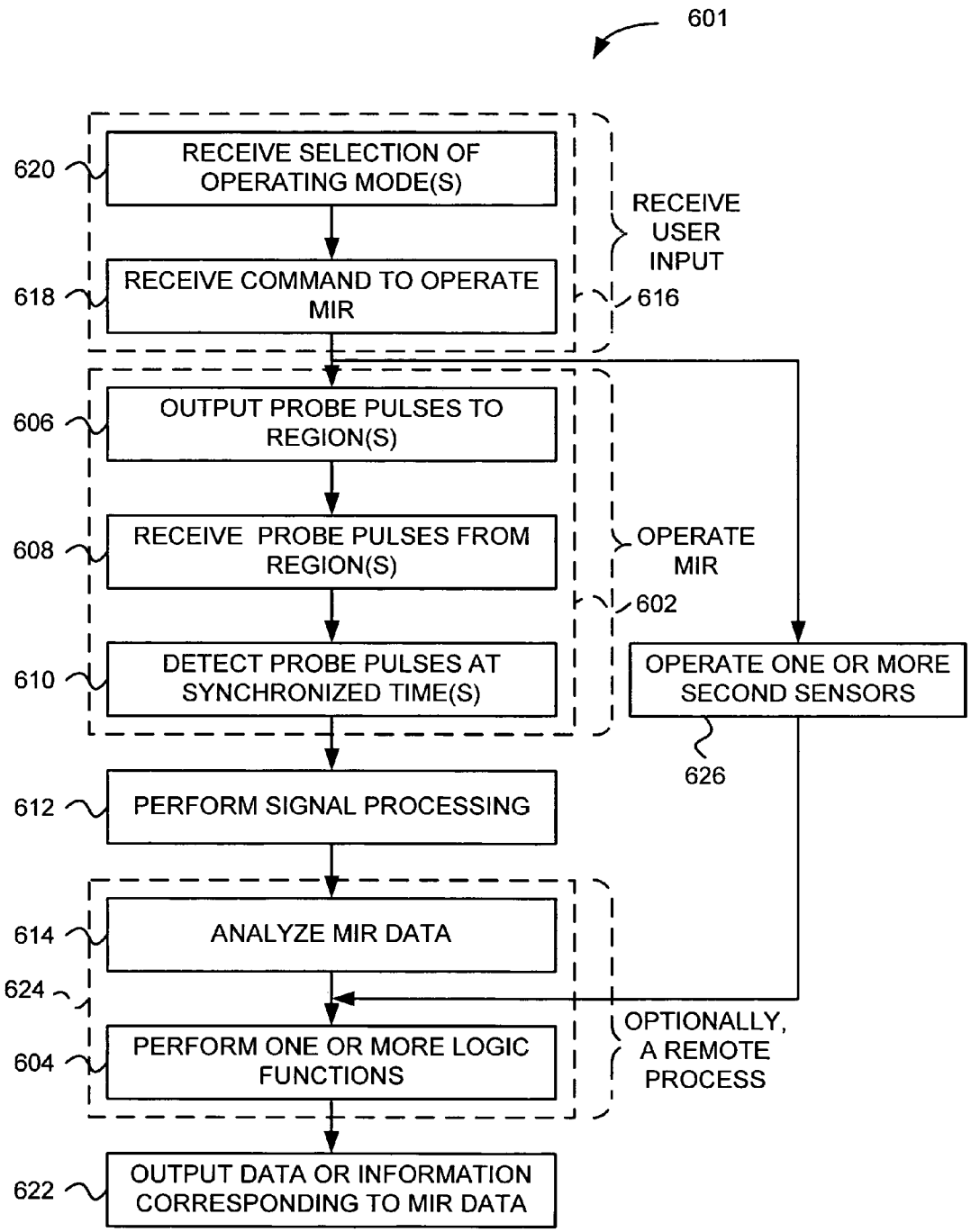
FIG. 6 is a flow chart showing a method for performing one or more logic functions for a personal electronic device responsive to MIR data, according to an embodiment.

FIG. 6 is a flow chart showing a method 601 for performing one or more logic functions for a personal electronic device (e.g., for a personal electronic device 402 shown in FIG. 4) responsive to MIR data, according to an embodiment. The method 601 can include step 602, wherein a MIR 101 operatively coupled to a personal electronic device 402 is operated to produce MIR data. The method 601 can then proceed to step 604 wherein one or more logic functions can be at least conditionally performed responsive to the MIR data.

Optionally, for example, for embodiments where the MIR is not physically integrated into the personal electronic device, the method 601 can include transmitting the MIR data to the personal electronic device via an exposed interface (step not shown). Alternatively, as described in conjunction with FIG. 4, all or portions of the MIR can be integrated into the personal electronic device, and the personal electronic device can generate the MIR data from received probe pulses. The MIR can be made according to a monostatic or a bistatic architecture, as described in conjunction, respectively, with FIGS. 4 and 5.

Operating the MIR in step 602 can include steps 606, 608, and/or 610 as shown. In step 606, probe pulses are output to one or more regions located peripheral to the personal electronic device 606. Proceeding to step 608, the probe pulses, backscatter from the probe pulses, and/or radiation corresponding to the probe pulses and altered by objects in the one or more regions is/are received. Proceeding to step 610, the received probe pulses are detected at times synchronized to the output of the probe pulses in step 606.

After operating the MIR in step 602 or included in step 602, the process 601 can proceed to step 612, wherein signal processing is performed on the received and detected probe pulses to extract the MIR data. The process 601 can proceed to step 614, wherein the MIR data is analyzed. Step 614 can optionally be included as part of step 602 and/or step 612. Step 614 can include analyzing the MIR data to extract information corresponding to the one or more logic functions performed in step 604. The MIR data can include information related to one or more of range, strength-of-response, direction, spectral characteristics, polarization, or Doppler characteristics. Examples of the information corresponding to the logic function(s) can include one or more of body size, body mass, height, body shape, posture, body permittivity, carried articles, detectable body ornamentation, a characteristic movement, a heart rate, an intracyclic heartbeat characteristic, breathing rate, a rate or magnitude of inhalation, a rate or magnitude of exhalation, a tremor of all or part of a body, an intracyclic breathing characteristic, a location of a user relative to the personal electronic device, a location of a plurality of persons relative to the personal electronic device, a position of the user relative to one or more regions peripheral to the personal electronic device, a position of a plurality of persons relative to one or more regions, a speed of the personal electronic device, a location of a motor vehicle operating position relative to the personal electronic device, and/or a location of the motor vehicle operating position relative to the user. Thus the one or more logic functions performed in step 604 can relate to a similar range of signal characteristics and/or information carried in the received probe pulses.

Optionally, the method 601 can include step 616, wherein user input can be received, for example, via a user interface of the personal electronic device. Receiving user input in step 616 can include step 618, wherein a command to operate the MIR is received. Additionally or alternatively, step 616 can include step 620, wherein a selection of one or more operating modes or parameters is received. The selection(s) received in step 620 can include parameter(s) for the MIR, specification of one or more (logical) responses of the personal electronic device to MIR data, or one or more automatic interactions with the MIR. For example, automatic interaction(s) can include one or more of a schedule of probes, coupling to a computer program-driven control, or coupling to received external commands. MIR parameters can include selection of a MIR probe direction or a subset of the one or more regions. MIR parameters, operating modes, or automatic interactions can optionally include interactions with the one or more second sensors.

Optionally, the method 601 can include step 622, wherein data or information corresponding to the MIR data can be output to a user via a user interface. For example, the user interface can include a display, a haptic output device, and/or an audio output device. For example, data or information output to the user in step 622 can include a minimally-processed representation of MIR data, a processed representation of MIR data, and/or operating parameter(s) changed responsive to the MIR data.

For example, in step 604, at least conditionally performing one or more logic functions can include selecting or changing one or more operating parameters responsive to the MIR data. The one or more operating parameter parameters can be operating parameter(s) of the portable electronic device. Optionally, at least conditionally performing one or more logic functions in step 604 can include analyzing the MIR data, shown for ease of description and understanding as a separate step 614 in FIG. 6. Optionally, some or all of signal processing step 612, MIR data analysis 614, and/or performing one or more logic functions in step 604 can be performed as a process 624 by a remote resource. In such a case, the process 624 can include transmitting data corresponding to the MIR data (or to received probe signals) to a remote resource (not shown). Step 624 can also include receiving, from the remote resource, one or more personal electronic device operating parameters or data (not shown) for output to the user.

Additionally or alternatively, the method 601 can include step 626, wherein one or more second sensors can be operated to receive second sensor data or signals. At least conditionally performing one or more logic functions in step 604 can perform one or more logic functions responsive to the MIR data and the second sensor data. Optionally, in some embodiments, step 604 can be performed responsive to second sensor data received in step 626 and not responsive to MIR data. Step 604 can include selecting one or more operating parameters for the personal electronic device responsive to the second sensor data or signals and/or from the MIR data. Similarly, outputting data via a user interface in step 622 can be performed responsive to the second sensor data or signals, alone or in combination with the MIR data.

Optionally, operating the MIR in step 602 can be performed responsive to the second sensor data or signal, and/or operating the second sensor(s)in step 626 can be performed responsive to the MIR data. The one or more second sensors can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor, for example.

Optionally, some or all of the method 601 shown in FIG. 6 can be embodied as computer readable instructions carried by non-transient computer readable media. Thus, the computer readable instructions can cause one or more computers to perform the steps.

FIG. 7 is a flow chart showing a method 701 for operating a MIR operatively coupled to a personal electronic device responsive to performing one or more logic functions for the personal electronic device, according to an embodiment. The method 701 can include step 702, wherein one or more logic functions is performed. For example, performing one or more logic functions for the personal electronic device can include having the personal electronic device perform the logic function(s), and/or can include having the logic function(s) performed by an external resource(s) operatively coupled to the personal electronic device. The personal electronic device can include a cellular phone, a smart phone, a personal data assistant, a pager, and/or a tablet computer, for example.

Proceeding to step 602, a MIR operatively coupled to a personal electronic device is operated responsive to the results of the logic function(s) of step 702 to produce MIR data. Operating the MIR in step 602 can include probing one or more regions located peripheral to the personal electronic device. Step 602 can include operating a MIR having at least a portion of the MIR located inside the personal electronic device. Optionally, the MIR can be located at least partially outside of the personal electronic device. Thus, operating the MIR in step 602 can include operating a MIR that is integrated with circuit board(s) in the personal electronic device (e.g., includes at least one component of the MIR inside the personal electronic device), as described above in conjunction with FIG. 4.

Optionally, step 602 can be performed by a MIR located external to the personal electronic device. When step 602 is performed by a MIR located external to the personal electronic device, the method 701 can also include step 704 wherein the MIR data is transmitted to the personal electronic device. Such externally-generated MIR data can be transmitted to the personal electronic device via an exposed interface. For example, the exposed interface can include a USB interface, a SIM card interface, a WiFi interface, a BlueTooth interface, a ZigBee interface, an infrared interface, or a proprietary interface.

As described above, the MIR can be formed in various permutations of internal and external, monostatic and bistatic architectures, relative to the personal electronic device. Aspects of these permutations are described above.

Operating the MIR in step 602 can include performing a number of sub-steps shown in FIG. 7. Beginning at step 706, one or more pulses can be generated by a pulse generator (see FIG. 1, 102). Next, in step 606, the one or more pulses are output to one or more regions located external to the personal electronic device. The probe pulses (including, potentially, the pulses themselves, backscatter from objects in the region(s), and/or pulses otherwise perturbed by objects in the region(s)) are then received in step 608 by one or more receiving antennas (see FIG. 1, 114). As shown in step 610, the received pulses are detected, for example, by a clocked receiver (see FIG. 1, 118) configured to latch in the received pulse at times synchronized to the pulse generator 102 via a range delay (see FIG. 1, 116). Proceeding to step 612, signal processing is performed on the received pulses to generate MIR data.

The method 701 can include analyzing the MIR data to extract information corresponding to the one or more logic functions in step 614. For example, the MIR data can include information related to one or more of range, strength-of-response, direction, spectral characteristics, polarization, and/or Doppler characteristics.

According to embodiments, information extracted during analysis of the MIR data in step 614 can include body size, body mass, height, body shape, posture, body permittivity, carried articles, detectable body ornamentation, a characteristic movement, a heart rate, an intracyclic heartbeat characteristic, breathing rate, a rate or magnitude of inhalation, a rate or magnitude of exhalation, a tremor of all or part of a body, an intracyclic breathing characteristic, a location of a user relative to the personal electronic device, a location of a plurality of persons relative to the personal electronic device, a position of the user relative to one or more regions peripheral to the personal electronic device, a position of a plurality of persons relative to one or more regions peripheral to the personal electronic device, a speed of the personal electronic device, a location of a motor vehicle operating position relative to the personal electronic device, and/or a location of the motor vehicle operating position relative to the user.

Optionally, the method 701 can include step 616 wherein user in put is received.

For example, receiving user input can be via a user interface of the personal electronic device 616. Receiving user input in step 616 can include receiving a command to operate the MIR, and/or receiving a command to execute step 702. Performing the logic function(s) in step 702 can include interpreting the input received in step 616. Performing logic function(s) in step 702 can also include determining when to operate the MIR. Performing one or more logic functions in step 702 can additionally or alternatively include determining one or more operating parameters of the MIR or selecting one or more interactions of the personal electronic device with the MIR. The interaction(s) of the personal electronic device with the MIR can include automatic interaction(s), which can include a schedule of probes, coupling to a computer program-driven control, or coupling to received external commands, for example. Optionally, user input (and corresponding logic functions) received in step 616 can include selection of MIR probe direction or range.

Optionally, the method 701 can include step 626, wherein one or more second sensors are operated (described more fully elsewhere herein). Accordingly, the logic function(s) performed in step 702 can include a determination of interactions with the second sensor(s).

After operating the MIR in step 602, the method 701 can proceed to step 614, wherein the MIR data is analyzed. According to embodiments, the method 701 can then proceed to step 712, wherein one or more operating parameters are selected for the personal electronic device and/or the MIR. For example, the personal electronic device can be driving to a power saving or a wake up state responsive to departure or arrival of a user from or to the region(s). Alternatively, step 712 can include selection of interactions of the personal electronic device with a network.

Alternatively or additionally to performing steps 614, 712 in the personal electronic device, MIR data analysis and/or selection of operating parameters can be performed by a remote resource operatively coupled to the personal electronic device via a communication network. Thus, the process 701 can include step 708, wherein the MIR data is transmitted to a remote resource, and then proceed to step 710, wherein one or more operating parameters or data regarding the operating parameters is received from the remote resource.

Optionally, the method 701 can include outputting data or information corresponding to the MIR data in step 622. Step 622 can include outputting the data or information to a user via a user interface such as a display, a haptic interface, and/or or an audio output device. Outputting data or information in step 622 can include outputting data as a minimally-processed representation of MIR data from the MIR, outputting a processed representation of MIR data from the MIR, or outputting a representation of operating parameter(s) selected or changed responsive to MIR data from the MIR, for example.

Optionally, (in addition or alternative to using the MIR to measure an operating environment of the personal electronic device), the method can include step 626, wherein one or more second sensors is operated. The second sensor(s) can include one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor. Accordingly, steps 704, 614, 712, 708, 710, and/or 622 can be performed responsive to the second sensor data, in addition or alternative to performing responsive to the MIR data.

Optionally, operating the MIR in step 602 can be performed responsive to the second sensor data or signal (not shown) received in step 626, or alternatively, operating the second sensor(s) in step 626 can be performed responsive to the MIR data received in step 602.

Optionally, some or all of the method 701 shown in FIG. 7 can be embodied as computer readable instructions carried by non-transient computer readable media. Thus, the computer readable instructions can cause one or more computers to perform the steps.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method, comprising:
   emitting a pulse from a pulse generator of a micro-impulse radar that is operatively coupled to a personal electronic device;
   receiving a return signal in response to the emitted pulse;
   processing the return signal, with a processor, to produce micro-impulse radar data that includes information about spatial location of an object;
   displaying the spatial location of the object in association with a map;
   at least conditionally performing one or more logic functions responsive to the micro-impulse radar data; and
   responsive to at least conditionally performing the one or more logic functions, analyzing the micro-impulse radar data to extract information corresponding to one or more of a heart rate of a person, breathing rate of a person, articles carried by a person, or tremor of all or part of a body of a person.

2. The method of claim 1, wherein the personal electronic device includes at least one of a cellular phone, a smart phone, a personal data assistant, a pager, or a tablet computer.

3. The method of claim 1, further comprising:
   transmitting the micro-impulse radar data to the personal electronic device via an exposed interface.

4. The method of claim 3, wherein the exposed interface includes a USB interface, a SIM card interface, a WiFi interface, a BlueTooth interface, a ZigBee interface, an infrared interface, or a proprietary interface.

5. The method of claim 1, wherein at least a portion of the micro-impulse radar is located inside the personal electronic device.

6. The method of claim 1, wherein the micro-impulse radar is integrated with at least one circuit board in the personal electronic device.

7. The method of claim 1, further comprising probing one or more regions located peripheral to the personal electronic device.

8. The method of claim 1, wherein the personal electronic device includes at least one component of the micro-impulse radar.

9. The method of claim 8, wherein the micro-impulse radar includes at least one component of a monostatic micro-impulse radar included in the personal electronic device.

10. The method of claim 8, wherein operating the micro-impulse radar includes operating at least one component of a bistatic micro-impulse radar included in the personal electronic device.

11. The method of claim 10, further comprising:
    detecting the pulses at times corresponding to the pulse emission.

12. The method of claim 1, wherein the micro-impulse radar data further includes information related to one or more of range, strength-of-response, direction, spectral characteristics, polarization, or Doppler characteristics.

13. The method of claim 1, further comprising analyzing the micro-impulse radar data to extract information corresponding to one or more of body size, body mass, height, body shape, posture, body permittivity, detectable body ornamentation, a characteristic movement, an intracyclic heartbeat characteristic, a rate or magnitude of inhalation, a rate or magnitude of exhalation, an intracyclic breathing characteristic, a location of a user relative to the personal electronic device, a location of a plurality of persons relative to the personal electronic device, a position of the user relative to one or more regions peripheral to the personal electronic device, a position of a plurality of persons relative to one or more regions peripheral to the personal electronic device, a speed of the personal electronic device, a location of a motor vehicle operating position relative to the personal electronic device, or a location of the motor vehicle operating position relative to the user.

14. The method of claim 1, further comprising:
    receiving user input via a user interface of the personal electronic device.

15. The method of claim 14, wherein receiving user input includes receiving a command to operate the micro-impulse radar.

16. The method of claim 14, wherein receiving user input includes receiving a selection of one or more operating parameters of the micro-impulse radar or of one or more responses of the personal electronic device to micro-impulse radar data.

17. The method of claim 16, wherein the one or more responses include one or more automatic interactions with the micro-impulse radar.

18. The method of claim 17, wherein the one or more automatic interactions include one or more of a schedule of probes, coupling to a computer program-driven control, or coupling to received external commands.

19. The method of claim 14, wherein receiving the one or more user commands include receiving selection of one or more operation modes.

20. The method of claim 1, further comprising:
    outputting data or information corresponding to the micro-impulse radar data to a user via a user interface.

21. The method of claim 1, wherein at least conditionally performing one or more logic functions responsive to the micro-impulse radar data includes analyzing the micro-impulse radar data from the micro-impulse radar.

22. The method of claim 1, further comprising:
    transmitting data corresponding to the micro-impulse radar data to a remote resource; and
    receiving, from the remote resource, one or more personal electronic device operating parameters or data for output to the user.

23. The method of claim 1, further comprising:
    operating one or more second sensors to receive second sensor data or signals.

24. The method of claim 23, wherein at least conditionally performing one or more logic functions includes selecting one or more operating parameters for the personal electronic device responsive to the second sensor data or signals and from the micro-impulse radar data.

25. The method of claim 23, wherein operating the micro-impulse radar is performed responsive to the second sensor data or signal.

26. The method of claim 23, wherein operating the one or more second sensors is performed responsive to the micro-impulse radar data.

27. The method of claim 25, wherein the one or more second sensors includes one or more of a microphone, a camera, a motion sensor, an accelerometer, a magnetic field sensor, an electronic compass, a gyroscope, a gravitational field sensor, a global positioning system receiver, a light sensor, an infrared sensor, a radio frequency sensor, a millimeter wave sensor, or a vibration sensor.

28. A method, comprising:
   emitting a pulse from a pulse generator of a micro-impulse radar that is operatively coupled to a personal electronic device;
   receiving a return signal in response to the emitted pulse;
   processing the return signal, with a processor, to produce micro-impulse radar data that includes information about spatial location of an object;
   displaying the spatial location of the object in association with a map;
   receiving signals from one or more second sensors;
   outputting data via a user interface, the data being responsive to the signals received from the one or more second sensors;
   at least conditionally performing one or more logic functions responsive to the micro-impulse radar data; and
   responsive to at least conditionally performing the one or more logic functions, analyzing the micro-impulse radar data to extract information corresponding to one or more of a heart rate of a person, breathing rate of a person, articles carried by a person, or tremor of all or part of a body of a person.

\* \* \* \* \*